United States Patent [19]

Ingman

[11] Patent Number: 5,347,862
[45] Date of Patent: Sep. 20, 1994

[54] FLUID FLOW METER

[76] Inventor: Dov Ingman, 3/55 Hiam Hazaz St. Savyonei Danya, Danya 34984, Israel

[21] Appl. No.: 979,996

[22] Filed: Nov. 23, 1992

[51] Int. Cl.⁵ .......................... G01F 1/54; G01F 3/00
[52] U.S. Cl. ................... 73/269; 73/861.21
[58] Field of Search ............. 73/269, 861.21, 861.18, 73/279, 715–728; 92/98 R, 96, 104

[56] References Cited

U.S. PATENT DOCUMENTS

| | | | |
|---|---|---|---|
| 398,013 | 2/1989 | Welker | 73/269 |
| 3,015,953 | 1/1962 | Petola | 73/861.2 |
| 3,175,399 | 3/1965 | Medlar | 73/861.2 |
| 3,792,204 | 2/1974 | Murayama et al. | 179/110 |
| 3,824,855 | 7/1974 | Heckle | 73/194 |
| 3,888,120 | 6/1975 | Burgess | . |
| 3,948,098 | 4/1976 | Richardson et al. | 73/194 |
| 4,141,246 | 2/1979 | Randolph | . |
| 4,358,954 | 11/1982 | de Jong | 73/269 |
| 4,409,830 | 10/1983 | de Jong et al. | 73/269 |
| 4,578,613 | 3/1986 | Posthuma de Boer et al. | 310/800 |
| 4,594,890 | 6/1986 | Baker, Jr. et al. | 73/232 |
| 4,920,794 | 5/1990 | Ingman | 73/269 |
| 5,069,067 | 12/1991 | Ingman | 73/269 |

FOREIGN PATENT DOCUMENTS 57-112525  7/1982  Japan .

*Primary Examiner*—Richard E. Chilcot, Jr.
*Assistant Examiner*—Harshad Patel
*Attorney, Agent, or Firm*—Robbins, Berliner and Carson

[57] ABSTRACT

The fluid flow meter includes a flexible membrane clamped between upstream and downstream centering springs to enhance membrane behavior and extend the fluid flow measurement range by automatically adaptively moving the apparent clamping points in response to flow rate. Adaptation of the clamping span alters the relative effective excess membrane length within the clamping span to adapt membrane behavior to flow rate. The upstream centering spring includes a long leaf spring pair cantilevered into the clamping span from the clamping region. The long leaf spring pair is sandwiched within a shorter leaf spring pair active at higher flow rates and formed as part of a guide extending to the chamber surface. The membrane ends are narrowed upstream and downstream of the clamping span to reduce flutter while the upstream intake is split into even laminar flows. The fluid direction is substantially changed at the outlet to minimize membrane distortion.

55 Claims, 4 Drawing Sheets

FLUID FLOW METER

BACKGROUND OF THE INVENTION

1. Field of the Invention

The present invention relates generally to devices for measuring volumetric fluid flow and more specifically to travelling wave or flexible membrane fluid flow meters which detect and measure the flow of compressible and non-compressible fluids in response to the undulations of a flexible membrane in a fluid flow passage.

2. Description of the Prior Art

Flexible membrane fluid flow meters operate by measuring the undulation of a flexible membrane caused by fluid flow past the membrane in a flow chamber. In a previous design for a flexible membrane fluid flow meter, as shown for example in Japanese Pat. 1,455,80 published Jan. 22, 1988 for Ohbaru Machine Industry Co., Ltd, a flexible member is mounted across a clamping span in a flow passage at single point clamping points by affixing each membrane end for free rotation about a rod mounted in the housing forming the passage. The length of the active flexible membrane between the single point clamping points is selected to be greater than the span between the clamping points so that membrane is free to undulate in the fluid flow. The excess membrane length, that is, the excess of the active membrane length between the clamping points over the span between the clamping points, substantially effects the membrane behavior.

Under ideal conditions, the excess membrane length should be sufficient to permit two or three contact points between the active membrane and the flow passage so that discrete quanta of determinable volumes of fluid are indicated by undulations of the active membrane. The excess membrane length for a particular flow passage cross-section and clamping span is a function of fluid flow rate. In order to accommodate wider ranges of measurable flow rates, conventional flexible membrane flow meters such as the Ohbaru design referenced above, proposed embodiments in which the active ends of the flexible membrane were clamped within rollers so that the excess membrane length could be adjusted for different flow rates. Clamping the active membrane ends within rollers provides single point clamping in that relatively unrestricted active membrane undulation is permitted within the clamping span in the same general manner as affixing the active membrane ends for free rotation about mounting rods.

One substantial problem with such conventional flexible membrane flow meters involved short operating life resulting from membrane fatigue due to repetitive flexing at the upstream and downstream clamping points and/or loss of membrane resiliency from remaining in the same curved shape for an extended period of time. Clamping the active membrane ends between rollers permitted the convenient renewal or replacement of the active membrane by unwinding unused flexible membrane from a storage reel through one set of clamping rollers, across the clamping span and through the other set of clamping rollers onto a take up reel. The storage and take up reels were adjusted to leave the appropriate excess membrane length within the clamping span for the flow rate to be measured.

An improved flexible membrane fluid flow meter is shown in U.S. Pat. No. 4,920,794, issued May 1, 1990 to the inventor hereof the disclosure of which is incorporated herein by this reference, in which the active portion of the flexible membrane extended between guide blocks fixed to the passageway or housing. The flexible membrane extended through the guide blocks to spring mounted rods which dynamically adjusted membrane excess length in response to fluid flow rates.

Active membrane behavior within the clamping span was enhanced by outwardly curved guiding surfaces having configurations similar to the flexible membrane in either of its two respective positions taken up just before and after release of a quantum of fluid. These guide surfaces included extensions from the clamping points of the guide blocks into the clamping span to the surface of the fluid passageway. Such extensions were made, for example, from permeable materials such as wire mesh so that they would not interfere with fluid flow. These guide extensions were provided to induce a degree of instability in the behavior of the flexible membrane to cause, even under a relatively low kinetic energy input, a relatively fast change of position of the active membrane between the positions taken up thereby just before and after passage of a quantum of fluid.

Enhancements of active membrane behavior were also achieved by applying resilient materials to the outwardly curving guiding surfaces, and even by resiliently mounting the guide blocks to the flow passage with springs. The flexible membrane was provided with thickened ends, and/or varying cross-sectional thickness along its length, to reduce membrane failure due to fatigue stresses.

A further improved flexible membrane fluid flow meter is shown in U.S. Pat. No. 5,069,067, issued Dec. 3, 1991 to the inventor hereof the disclosure of which is incorporated herein by this reference, in which active membrane behavior was enhanced with multi-component membranes. Stopper members in the form of flexible leaf springs further enhance active membrane behavior by acting as flexible extension guides extending outward from the inner surfaces of the guide blocks. The stopper members limit the flexing motion of the active membrane which strikes the stopper members sequentially as it flexes causing piezoelectric elements mounted thereon to sequentially generate signal pulses representing the passage of a quantum of fluid flow.

In addition, excess membrane length within the clamping span was dynamically adjusted in accordance with fluid flow rates by diaphragms and drogues acted upon by the flowing fluid to reposition the spring mounted membrane mounting rods. In particular, during periods of minimal flow rates, the membrane could be maintained in a fully flattened condition by springs acting upon the mounting rods. In addition, the distance between the spring mounting clamps at the ends of the membrane was adaptively changed to compensate for higher flow rates.

Still further improvements in flexible membrane fluid flow meter design are required, however, to provide additional control of membrane behavior within the clamping span in order to increase the useful range of fluid flow rates and fluid characteristics that may be accurately measured, to further improve membrane operating lifetimes, and to reduce the cost and complexity of meter construction and operation.

SUMMARY OF THE INVENTION

In accordance with a first aspect, the present invention provides an improved wide range, flexible membrane fluid flow meter using centering clamping in which pairs of centering springs at one or both ends of the active portion of the flexible membrane are used to increase useful flow measurement range and reduce membrane fatigue. One portion of each centering spring pair accumulates energy as the associated end of the active membrane moves away from the centered position as a result of membrane undulation due to fluid flow. The centering springs enhance the snap or toggle action of the membrane by returning the accumulated energy, in the form of potential elastic energy, to the active membrane end when that membrane end achieves its maximum angular excursion from the centered position to return thereto. The centering springs modify the behavior of the membrane to simulate a longer membrane as well as change the rigidity, and therefore the resonant frequency, of the system. The centered position is in a plane extending from the clamping region parallel to the plane of the fluid path.

The centering spring pairs provide effective or apparent clamping points offset from the conventional, single point rigid, or fixed clamping points. The amount of offset is responsive to fluid flow rate. The dependence of apparent clamping point offset on flow rate results in the effective clamping span, that is the span between apparent clamping points, being responsive to flow rate. While the actual excess membrane length may not change with flow rate, the effective relative excess membrane length, that is, the ratio of excess membrane length to effective clamping span, is adaptively adjusted in response to fluid flow rate.

For example, at the lowest measurable flow rate, the apparent upstream clamping point is maximally offset downstream from the fixed clamping point region because the relatively low energy provided by the resultant undulation is sufficient to bend the spring only by a minimal amount. As flow rate increases, the energy available for undulation at the upstream membrane end, and therefore the excursion of the membrane end from the centered position, increases in response to the increasing undulation. At such higher flow rates, the apparent clamping point adaptively migrates upstream towards the fixed clamping region. Similarly, an apparent downstream clamping point provided by the centering spring pairs adjacent the downstream clamping region migrates upstream into the clamping span in response to low fluid flow rates or downstream from the clamping region, beyond the clamping span, in response to high flow rates. The effective relative excess membrane length is therefore different at different flow rates because the effective clamping span changes with flow rate.

Variable resilience centering spring pairs, which can be formed by multiple sets of leaf spring pairs having differing pair lengths, provide increased flow rate adaptation because the rate of apparent clamping point migration changes as the apparent clamping point migrates. In a preferred embodiment, the variable resilience centering spring pairs include a pair of equal length inner centering leaf springs surrounding the upstream active membrane end. The inner centering leaf spring pair is sandwiched between a pair of equal length outer centering leaf springs. The outer leaf spring pair is substantially shorter than the inner centering leaf spring pair. That is, the extension of the outer centering leaf spring pair from the fixed clamping point region is substantially less than extension of the inner centering leaf spring pair from the fixed clamping point region. It is important that each spring in a pair is of equal length to avoid asymmetrical membrane behavior, but the exact length of the spring pairs is not critical, easing manufacturing tolerances.

When the flow rate increases sufficiently that the undulation of the active membrane end migrates towards the end of the shorter, outer leaf spring pair, the resilience of the bending outer leaf spring is added to the resilience of the bending inner centering leaf spring substantially changing the rate of adaptation of the clamping span in response to flow rate. In particular, the shorter, outer centering leaf spring pair is selected to control membrane behavior at the highest measurable flow rate.

The operation of long, flexible membranes in fluid flow meters are often analyzed or described, for convenience, in terms of the behavior of an ideal or infinite travelling wave. As the clamping span of the membrane is increased, the effect of the clamping points on membrane behavior is reduced, typically making the behavior of the membrane to fluid flow more predictable. For example, as the behavior of the membrane approaches the behavior of an infinite travelling wave, the range of accurately measurable flow rates may substantially improve. In an infinite travelling wave, as may be imagined to propagate along an infinitely long membrane, there would be a continuous transformation of potential elastic energy into kinetic energy and vice-versa. That is, as the wave propagated along the membrane, elastic energy would be continuously converted into kinetic energy and returned to potential elastic energy.

In the present invention, elastic energy accumulators in the form for example of centering leaf spring pairs, reduce the effects of the actual clamping points on membrane behavior permitting the membrane to more closely simulate the behavior of an infinitely long membrane. That is, the elastic energy accumulators of the present invention improve membrane behavior beyond what would conventionally be expected from the actual length.

In another aspect, the present invention provides a fluid flow meter including a long, flexible membrane, upstream clamping means for mounting a first end of the membrane in an upstream clamping region in a fluid flow path, downstream clamping means for mounting a second end of the membrane in a downstream clamping region in the fluid flow path at a clamping span distance downstream from the upstream clamping region, the length of the membrane between the first and second ends exceeding the clamping span distance by an excess membrane length to permit an undulating motion of the flexible membrane along the clamping span distance in response to a rate of flow of fluid in the path, sensor means responsive to the undulating motion for measuring the flow of fluid in the path, and centering spring means within the clamping span distance for resiliently resisting motion of the membrane from a central plane which is substantially perpendicular to the path.

In another aspect, the invention provides a fluid flow meter including a flexible membrane having a first length, a fluid flow chamber including a fluid flow inlet port and a fluid flow exit port, a first pair of flexible leaf springs, inlet clamping means for clamping the pair of leaf springs to lie flat along either side of a first end of the membrane adjacent the fluid flow inlet port in a central plane in the fluid flow chamber, and exit clamping means for clamping a second end of the membrane in the central plane adjacent the fluid flow exit port at a distance from the first end less than the first length, whereby undulation of the membrane at the first end is resisted by the pair of leaf springs.

In a still further aspect, the present invention provides a method for enhancing the behavior of a flexible membrane in a fluid flow meter by mounting a flexible membrane in a fluid flow chamber, clamping a first pair of leaf springs to lie along either side of a first end of said membrane adjacent in a central plane in said fluid flow chamber, and clamping a second end of said membrane in said central plane, whereby undulation of said membrane at said first end is resisted by said pair of leaf springs.

These and other aspects of the invention will become apparent from the following detailed description, taken in conjunction with the accompanying drawings, which illustrate, by way of example, the principles of the invention.

DETAILED DESCRIPTION OF THE PREFERRED EMBODIMENT

Figure 1:
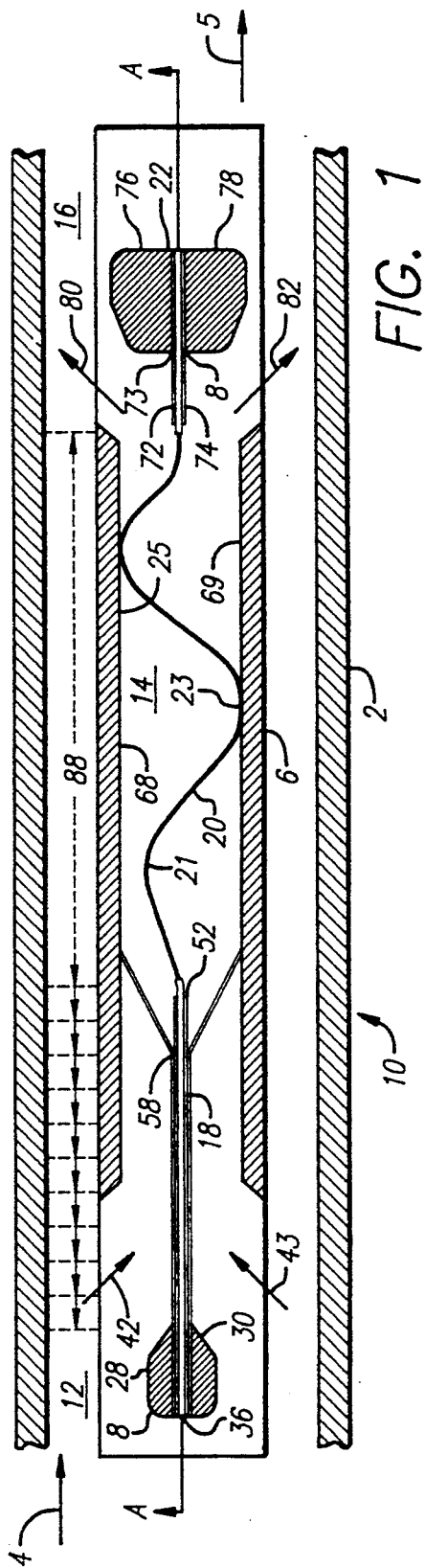
FIG. 1 is a partial cross sectional side view of a fluid flow meter in accordance with the present invention.
Figure 2:
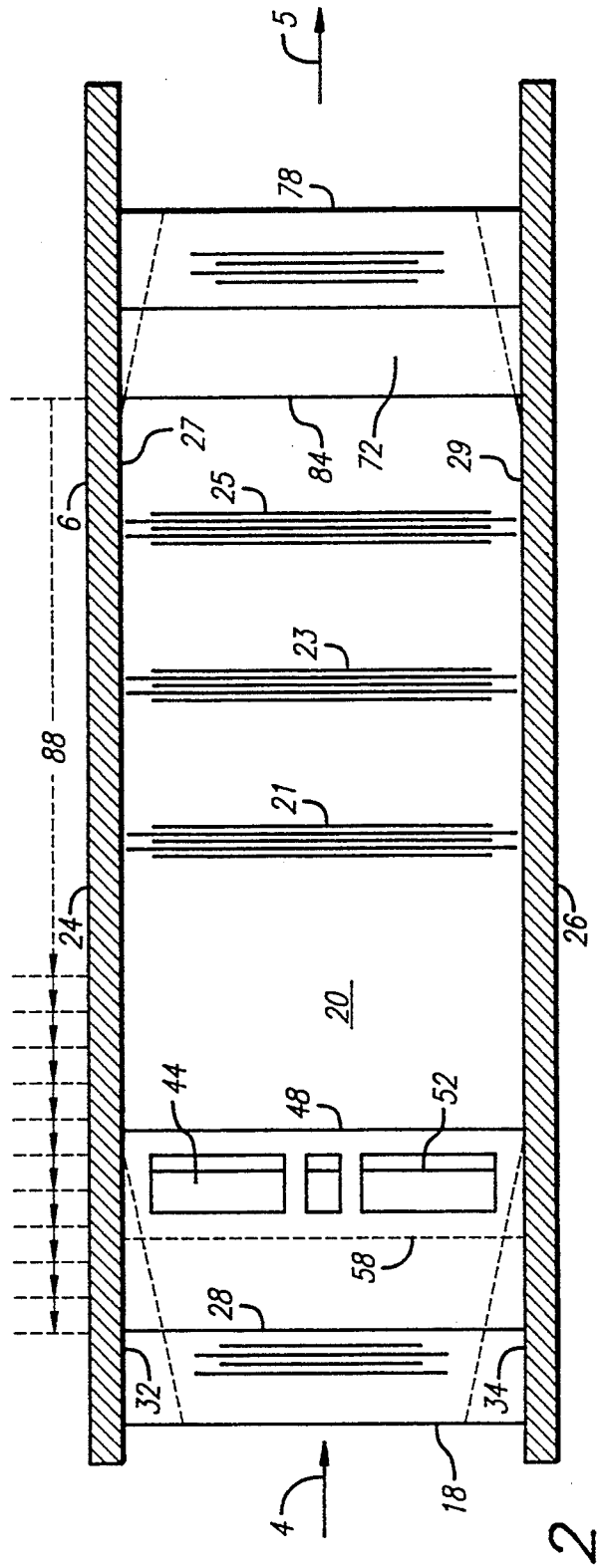
FIG. 2 is a top plan view of the flexible membrane assembly within a partial cross section cutaway of the flow meter chamber, in accordance with the embodiment of the invention shown in FIG. 1.

Referring now to FIGS. 1 through 8, flexible membrane fluid flow meter 10 of the present invention is useful over an extremely wide flow range in which the ratio of maximum to minimum measurable flow rates is on the order of about 1,000 or greater. FIG. 1 shows a partial cross-sectional view of wide range fluid flow meter 10 in which flow meter housing 2 includes inlet aperture 4, central flow chamber 6 in which is mounted sensor membrane assembly 8, and outlet aperture 5. The fluid flow path within flow meter housing 2 includes inlet chamber 12 upstream of central flow chamber 6, sensor chamber 14 within central flow chamber 6, and exit chamber 16 downstream of central flow chamber 6. Sensor membrane assembly 8 includes inlet membrane mounting assembly 18, shown in an enlarged view in FIG. 3, in which the inlet or upstream portion of flexible sensor membrane 20 is mounted and clamped. Sensor membrane assembly 8 includes outlet membrane mounting assembly 22 in which the outlet or downstream portion of flexible sensor membrane 20 is mounted and clamped. FIG. 2 is a top plan view of wide range fluid flow meter 10, in which sensor membrane assembly 8 is shown as seen from above positioned within a partial cross section of central flow chamber 6 taken along line AA.

In operation, fluid flowing within flow meter housing 2 enters inlet chamber 12 through inlet aperture 4 causing measurable undulation of flexible sensor membrane 20 within sensor chamber 14 before exiting exit chamber 16 through outlet aperture 5. During flow measurement, flexible sensor membrane 20 includes one or more wave crests 21, 23, and/or 25 which form in response to fluid flow. At no flow and low flow rate conditions, a three point contact is desired. That is, the effective relative excess length of sensor membrane 20 in the active portion of central flow chamber 6 is selected so that wave crests 21, 23, and 25 may all contact either upper chamber face 68, or lower chamber face 69, providing three points of actual contact between the membrane and the chamber faces.

Alternatively, the three points of contact may be provided by two actual points of contact and one point of near contact. In particular, it may be convenient to permit two such crests to actually contact the chamber faces and one crest, such as wave crest 21 as shown in FIG. 1, to closely approach contact with the chamber face.

In all such arrangements for achieving the effect of three points of contact, one such point of contact is on one side of the center line, such as the single contact point at wave crest 23. The other two points of contact or near contact, called herein the dual contacts points, are on the other side of the centerline, such as wave crests 21 and 25.

In an optimal configuration, the shape of flexible sensor membrane 20 is controlled primarily by the operation of the leaf springs, particularly the operation of inlet membrane mounting assembly 18, in conjunction with the effect of the single contact point between flexible sensor membrane 20 with central flow chamber 6. In FIG. 1, the single contact point at wave crest 23 is shown in contact with lower chamber face 69. At the next wave evolution, the single contact point at wave crest 23 would occur at the other surface of central flow chamber 6 at upper chamber face 68.

The above noted optimal configuration in which the shape of the membrane is controlled by the leaf springs and single point contact may be demonstrated under no flow conditions by determining the change in shape of the membrane, if any, upon removal of the chamber face in contact with the dual contact points. This is particularly effective when, as shown in FIG. 1, the effective three point contact is achieved with two actual contact points and one near contact.

In particular, the optimal configuration, in terms of the effective excess membrane length, may be demonstrated in flow meter 10 under no flow conditions in the position shown in FIG. 1, by removing upper chamber face 68 so that the single point contact at wave crest 23 is the only contact point. The shape of the membrane at wave crest 21 will not be affected by the removal of upper chamber face 68 because wave crest 21 is not in contact with upper chamber face 68. In an optimal configuration, the shape of wave crest 25 will also not be affected by the removal of upper chamber face 68 because the effective excess membrane length is sufficient to permit contact at wave crest 25 but not sufficient to permit any flattening out of membrane 20, at wave crest 25, against upper chamber face 68.

As flow rate increases, the number of such contact points, that is, the number of crests which actually contact chamber face 68 or 69 steadily decreases from three to two to one to none. At high flow rates, the membrane behavior approaches a standing wave in which the height of undulation of each wave crest is the same as the other wave crests, none of which contact the chamber faces.

If the relative effective excess membrane of membrane 20 in FIG. 1 is selected so that at no flow conditions there will be three actual contact points, then the shape of membrane 20 shown in FIG. 1 represents the range of flow rates in which the flow rate is high enough so that the upstream crest, crest 21, no longer contacts a chamber face while the downstream crests, such as crests 23 and 25, continue to contact the chamber faces.

In this range of flow rates, flow induced undulation of flexible sensor membrane 20 will cause crest 21 to propagate downstream from the position shown in which it is close to but not in contact with upper chamber face 68, until crest 21 was in contact with lower chamber face 69 at about the position shown for crest 23. Crest 21 would then propagate further downstream until it was in contact with upper chamber face 68 at about the position shown in FIG. 1 for crest 25. The next crest following 21 would propagate downstream from first flexure line 52, increasing in height so that it would be approximately the same distance from lower chamber face 69 as crest 21 is shown from upper chamber face 68 and then contact upper chamber face 68 at about where crest 23 is shown to contact lower chamber face 69 and then contact lower chamber face 69 at about where crest 25 is shown to contact upper chamber face 68.

As the flow rate changes, the number of contact points between crests of membrane 20 in actual contact with faces of flow chamber 6 steadily changes as the number of half-wave-lengths within the active portion of the membrane changes.

An ideal membrane would be one formed from material with very low mass and low modulus of elasticity. Theoretically, with a zero mass membrane, the resonant frequency of the membrane would be infinite and the starting flow rate would be near zero. That is, the membrane would not resonate or flutter because the actual frequency of motion induced in the membrane would always be less than the theoretically infinite resonant frequency. In addition, this theoretical membrane would require only negligible energy to begin moving in response to the fluid flow and would therefore begin to move and measure in response to a very low flow rate.

The mass of membrane 20 is proportional to its thickness while the bending elasticity is proportional to the cube of the thickness. Therefore, decreasing the thickness of the membrane to reduce the mass reduces the bending elasticity even faster. As a result, there is a limit to the possible reduction in membrane thickness at the limit at which the bending elasticity has been reduced below the level required to maintain membrane shape against the force of gravity. If the membrane is too thin and the bending elasticity is thereby reduced too far, the membrane will simply lie limply on the lower membrane face, such as lower chamber face 69 as shown in FIG. 1.

The membrane thickness should therefore be established by trading off membrane mass reduction against the required elasticity to maintain its own weight against the force of gravity. As long as this minimum elasticity is maintained, the orientation of flow meter 10 will not influence sensor performance.

However, although the thinnest membrane capable of maintaining its shape against gravity is desirable for the reasons just discussed, membrane thickness is desirable in order to minimize leakage across the membrane, for example across edges 27 and 29. As the membrane is made thicker, the required manufacturing tolerances to maintain the effective seal between edges 27 and 29 and sidewalls 24 and 26, respectively, may be relaxed thereby reducing manufacturing costs.

The ideal membrane would therefore be relatively thick to minimize sealing problems, relatively thin to minimize mass and have low elasticity while still being able to maintain its own weight. In accordance with the present invention, a porous membrane material, such as a poly-tetra-fluoro-ethylene (or PTFE) porosive film, may be used. Advantageously, a porous membrane has minimum mass and elasticity with maximal thickness. The particular material selected may be sufficiently porous to provide these advantages while maintaining a sufficient seal, in light of the changing but on average equal pressures across the membrane, to avoid a problem with sealing.

In addition, the use of porous membrane materials provides additional advantages. A porous membrane is compressible and, in areas of substantial bending such as wave crests 21, 23, and 25, the compression reduces the high tensile stresses that might otherwise accompany the stretching of the outer surface of the curved membrane and the shortening of the inner surfaces at these bending areas. In particular, a porous membrane will be compressed at the wave crests and contact points making the membrane thinner in these regions thereby increasing membrane reliability.

Returning now to a description of the mechanical configuration of flow meter 10 shown in FIGS. 1 and 2, inlet membrane mounting assembly 18 includes upper rigid mounting block 28 and lower rigid mounting block 30 which rigidly and mechanically clamp together the remaining portions of inlet membrane mounting assembly 18 as shown below in greater detail, particularly with respect to FIG. 3. In addition, inlet membrane mounting assembly 18 is rigidly mounted to central flow chamber 6 in inlet chamber 12 adjacent inlet aperture 4 by affixing upper and lower rigid mounting blocks 28 and 30 to central flow chamber 6, and/or to each other. In particular, as shown in FIG. 2, transverse mounted ends 32 and 34 of upper rigid mounting block 28 are rigidly affixed, by glue or other means not shown, to sidewalls 24 and 26 of central flow chamber 6, respectively.

Figure 3:
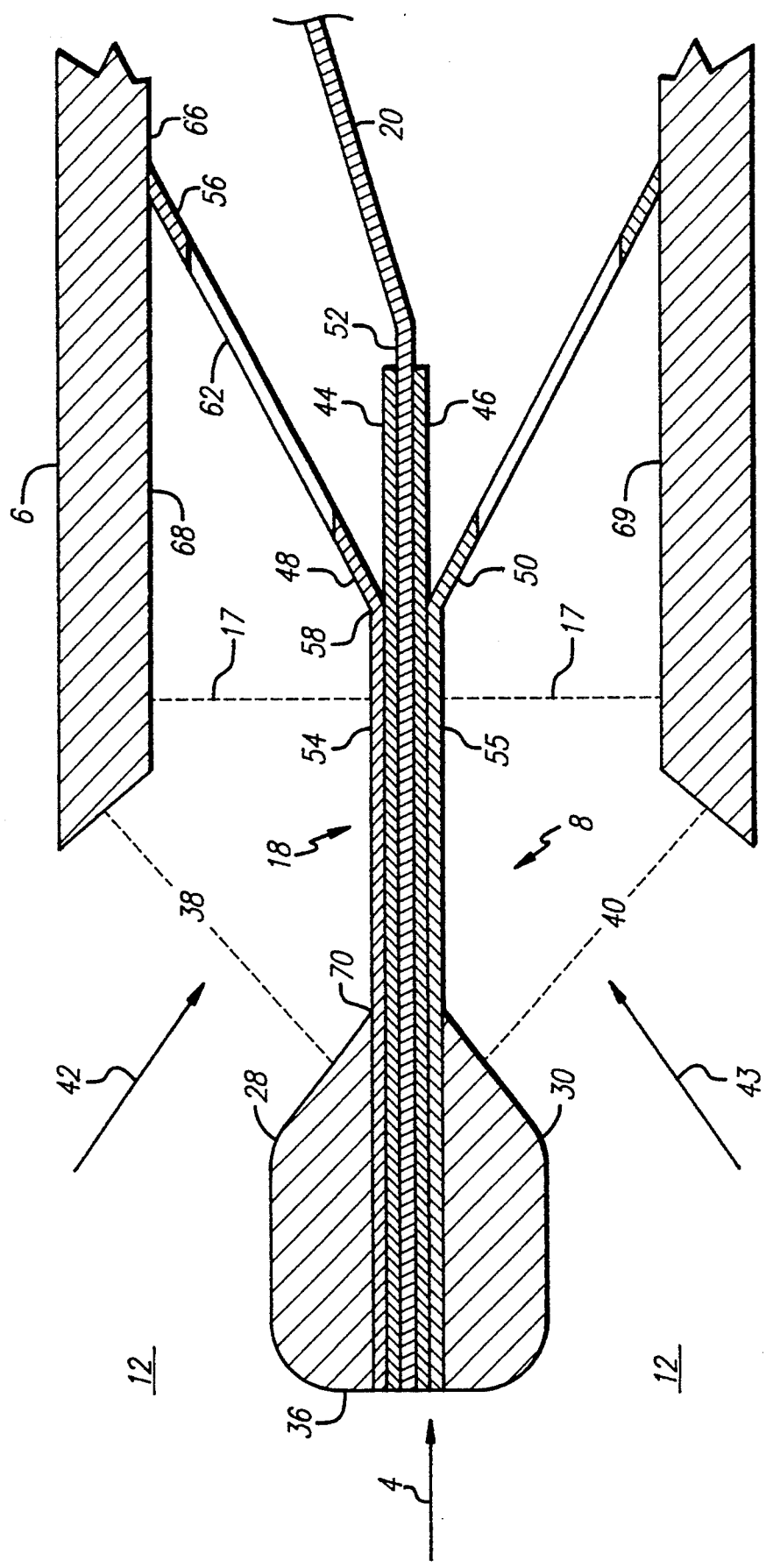
FIG. 3 is an enlarged view of the fluid inlet portion of the fluid flow meter shown in FIG. 1.
Figure 7:
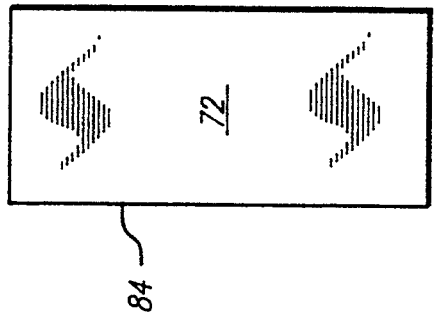
FIG. 7 is a top plan view of an exit membrane spring member as shown in FIG. 1.

As shown in FIG. 3, leading edge 36 of sensor membrane assembly 8 is thereby presented across the path of fluid flow entering inlet aperture 4 to form inlet chamber 12 into a pair of rectangular cross section inlet prechambers 38 and 40 to divide the inlet fluid flow into a pair of substantially equal laminar streams, upper fluid stream 42 passing above upper rigid mounting block 28 through upper rectangular inlet prechamber 38 and lower fluid stream 43 passing below lower rigid mounting block 30 and through lower rectangular inlet prechamber 40. The angular departure of upper and lower fluid streams 42 and 43 from the central plane of sensor chamber 14 in central flow chamber 6 is up to about 45°.

The combination of upper and lower rigid mounting blocks 28 and 30 present leading edge 36, followed downstream by a substantial flow dividing cross sectional area, to the inlet fluid flow which helps to make the resultant fluid flows in rectangular cross section inlet prechambers 38 and 40 laminar even if the fluid flow upstream of inlet aperture 4 was turbulent. The length of upper and lower rectangular inlet prechambers 38 and 40 along the flow path is selected to be on the order of about 1/15th of the length of sensor chamber 14 to avoid extreme deflections of flexible sensor membrane 20 during low fluid flow rate measurements.

The rigidly mounted, flow dividing cross sectional area of inlet membrane mounting assembly 18 immediately downstream of leading edge 36 also serves to compensate for possible asymmetry in such flows resulting from inlet design or obstructions so that upper and lower fluid streams 42 and 43 are substantially equal and laminar. In addition, the equal cross sectional areas of upper and lower rectangular inlet prechambers 38 and 40 are each about four times the cross sectional area of sensor chamber 14 which is itself then divided approximately in half by flexible sensor membrane 20. The fluid flow rate in the portions 17 of sensor chamber 14 above and below flexible sensor membrane 20 is therefore increased because of the reduction of the cross sectional area through which the fluid flows by a factor of about eight. This substantial increase in fluid flow rate in central flow chamber 6 above the fluid flow rate in flow meter housing 2 in inlet chamber 12 permits flow meter 10 to measure more conveniently the lower range of fluid flow rates.

Flexible sensor membrane 20 is mechanically clamped by upper and lower rigid mounting blocks 28 and 30 in a central plane, parallel with and centered between upper and lower chamber faces 68 and 69 of sensor chamber 14 in central flow chamber 6. Flexible sensor membrane 20 extends from leading edge 36, through the fixed clamping point region downstream thereof past trailing edge 70, in a centered position, that is, in the central plane between the parallel planes of upper and lower chamber faces 68 and 69.

In inlet membrane mounting assembly 18, flexible sensor membrane 20 is sandwiched between a pair of relatively long flat centering inner leaf springs 44 and 46, one of which is described in greater detail below with regard to FIG. 5. Long centering leaf springs 44 and 46 are themselves sandwiched between upper and lower resilient guides 48 and 50, one of which is described below in greater detail with respect to FIG. 6. The combination of the inlet end of flexible sensor membrane 20, long centering leaf springs 44 and 46, and upper and lower resilient guides 48 and 50 are held rigidly in place between upper and lower rigid mounting blocks 28 and 30.

Figure 5:
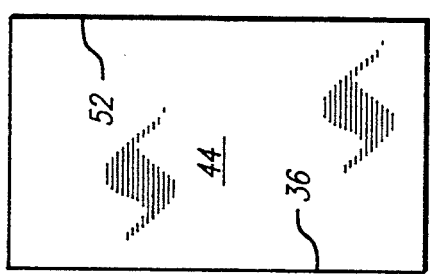
FIG. 5 is a top plan view of a long membrane spring member as shown in FIG. 1.

Referring now to FIG. 5, long centering leaf spring 44 is formed from a flat, flexible sheet of material and extends along flexible sensor membrane 20 from leading edge 36 to first flexure line 52. At rest, long centering leaf spring 44 lies preferably flat against, or at least substantially adjacent to, flexible sensor membrane 20. During undulation of flexible sensor membrane 20 caused by fluid flow through sensor chamber 14, long centering leaf spring 44 resists upward motion of flexible sensor membrane 20 from first flexure line 52 upstream towards the fixed clamping point region which extends between leading edge 36 and trailing edge 70. The fixed clamping point region rigidly holds the end of flexible sensor membrane 20 and permits neither up or down, transverse, nor rotational motion thereof during such undulation.

Figure 6:
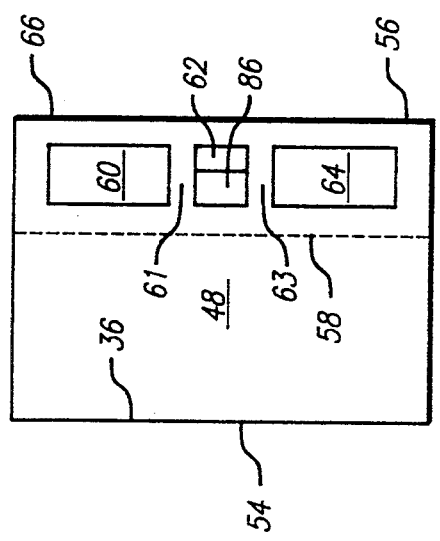
FIG. 6 is a top plan view of a short membrane spring member and membrane guide as shown in FIG. 1.

Referring now also to FIG. 6, upper resilient guide 48 is formed from a contiguous pair of flat panels, in particular, short centering leaf spring 54 and guide panel 56 which are joined to each other at an angle at second flexure line 58. Upper resilient guide 48 may conveniently be formed from a thin, flat sheet of resilient material similar to the material used for forming long centering leaf spring 44 which is creased and bent at second flexure line 58 to form short centering leaf spring 54 and guide panel 56 therefrom. Guide panel 56 includes window apertures 60, 62 and 64 therethrough, which permit relatively unobstructed passage of upper fluid stream 42. The majority of the fluid in upper fluid stream 42 pass through windows 60 and 64 which are larger than and positioned outboard from central window 62 in order to provide and enhance the lateral stability of the undulation of flexible sensor membrane 20. For example, passage of upper fluid stream 42 evenly through both outboard windows 60 and 64 to form a pair of substantially equal streams tends to prevent twisting and fluttering of flexible sensor membrane 20 so that edges 27 and 29 of flexible sensor membrane 20 adjacent sidewalls 24 and 26, shown in FIG. 2, remain at equal levels to each other as flexible sensor membrane 20 undulates. Guide strips 61 and 63, positioned between windows 60 and 62 and between 62 and 64, respectively are located in the rotational path of piezoelectric sensor 86, shown in FIG. 4, during undulation of flexible sensor membrane 20.

At rest, short centering leaf spring 54 preferably lies flat against or at least substantially adjacent long centering leaf spring 44 which similarly lies flat or substantially flat against the inlet end of flexible sensor membrane 20 while distal edge 66 of upper resilient guide 48 rests gently against upper face 68 of central flow chamber 6. Although it is convenient to form upper resilient guide 48 from a single sheet of flat material and rest distal edge 66 gently against upper face 68 so that guide panel 56 remains flat, the shape of guide panel 56 may be adjusted and the resilience of short centering leaf spring 54 may be adjusted to accommodate the requirements of a particular application for fluid flow meter 10.

At rest, upper resilient guide 48 preferably extends flat along flexible sensor membrane 20 from leading edge 36 to second flexure line 58 so that short centering leaf spring 54 lies flat against long centering leaf spring 44 parallel to flexible sensor membrane 20 while guide panel 56 extends from second flexure line 58 to upper face 68. Similarly, lower resilient guide 50 extends flat along flexible sensor membrane 20 from leading edge 36 to second flexure line 58 so that short centering leaf spring 55 lies flat against long centering leaf spring 46 parallel to flexible sensor membrane 20. During undulation of flexible sensor membrane 20 caused by fluid flow through sensor chamber 14, long centering leaf spring 44 resists upward motion of flexible sensor membrane 20 from about first flexure line 52 upstream towards leading edge 36 until second flexure line 58 is approached during such undulation. Thereafter, the combination of long centering leaf spring 44 and short centering leaf spring 54 serve to resist upward motion of flexible sensor membrane 20 during undulation. Downward motion of flexible sensor membrane 20 is resisted by the combination of long centering leaf spring 46 and short centering leaf spring 55.

The migration of the upstream edge of undulation of the active portion of flexible sensor membrane 20 towards the fixed clamping point region extending from leading edge 36 to trailing edge 70, against the resistance of the bending centering leaf springs, adaptively moves the apparent clamping point. The apparent clamping point is the node or nodal point along the extension of the active membrane from the fixed clamping point region at which the membrane has not moved from the centered position so that a fixed clamping point could be positioned there without changing the effective undulating behavior of the membrane. If the apparent clamping point is downstream of the downstream clamping region and therefore outside of the clamping span, the apparent clamping point is the nodal point that may be extrapolated from the sinusoidal shape of the membrane sufficient upstream of the downstream centering springs not to be modified thereby. As the apparent clamping point of the active membrane migrates, the effective clamping span between the apparent clamping points is adaptively changed, thereby automatically adapting the relative effective excess membrane length.

This automatic adaptation of the clamping span enhances membrane behavior in response to a wide range of fluid flow rates while the centering action of the centering spring pairs reduces membrane fatigue extending operating life.

It is important to note that the resistance to motion of flexible sensor membrane 20 applied by inlet membrane mounting assembly 18 changes as the portion of the membrane tending to move by undulation migrates upstream toward inlet aperture 4 past first flexure line 52 and then again as it migrates past second flexure line 58. That is, as the fluid flow rate increases, the furthest upstream point of undulation of flexible sensor membrane 20 cannot migrate into the fixed clamping region extending between leading edge 36 and downstream or trailing edge 70 of upper rigid mounting block 28.

In other words, during undulation of flexible sensor membrane 20 resulting from a relatively low fluid flow rate, the magnitude of the wave height of the undulation will be maximum, extending from upper chamber face 68 to lower chamber face 69 so that piezoelectric sensor 86 contacts guide strips 61 and 63. At low flow rates, the resistance to undulation provided by long centering leaf spring 44 is sufficient to prevent substantial upstream migration of the most upstream point of undulation of flexible sensor membrane 20. As the flow rate increases, the magnitude of the wave height of the undulation will decrease so that the membrane may no longer contact upper and lower chamber faces 68 and 69. At such higher flow rates, the undulation of flexible sensor membrane 20 begins to emulate infinite wave propagation. The most upstream point of undulation will, however, migrate further upstream toward trailing edge 70 at such higher flow rates. At such high flow rates, flexible sensor membrane 20 is no longer apparently clamped adjacent second flexure line 58, but only at trailing edge 70.

In this way it can clearly be seen that the combination of long centering leaf spring 44 and short centering leaf spring 54 serve to automatically vary the effective length of flexible sensor membrane 20 in response to fluid flow rates by varying the point along the membrane at which it is apparently clamped. By automatically adjusting the clamping span by moving the apparent clamping points along the flexible membrane in the central plane, the effective length of the active membrane is adjusted without the need to move the fixed mounting of the ends of the membrane as is required in prior art designs. In addition, the trailing edge 70 of upper rigid mounting block 28 is a simple straight line rather than requiring the curved or angled interior surfaces of the interior of the conventional guide blocks. Trailing edge 70 serves as the downstream end of the fixed clamping point region at the upstream end of the active portion of the flexible membrane. The extended fixed clamping region of the present invention serves to further center flexible sensor membrane 20 within central flow chamber 6 rather than to permit free rotation of the membrane in accordance with the single point clamping of some of the prior art designs.

Referring now again to FIGS. 1, 2 and 7, outlet membrane mounting assembly 22 is similar to inlet membrane mounting assembly 18 in that the downstream end of flexible sensor membrane 20 is sandwiched between a pair of centering leaf springs 72 and 74 which are clamped between a pair of upper and lower rigid mounting blocks 76 and 78 rigidly affixed to sidewalls 24 and 26. Upper fluid stream 42 reaches exit chamber 16 by means of antechamber 80, and lower fluid stream 43 reaches exit chamber 16 by means of antechamber 82. Antechambers 80 and 82 causes the fluid flow to substantially change direction at the downstream end of flexible sensor membrane 20 to reduce any tendency of the downstream end of the membrane to be forced by the fluid flow into an unwanted distortion or undesirable contact with some portion of central flow chamber 6 or flow meter housing 2. In addition, sensor chamber 14 is terminated upstream of the point of contact of outlet centering leaf springs 72 and 74 resulting from maximum bending thereof, so that at high flow rates, the fluid flow will not cause rotation of either such outlet leaf spring independent of membrane undulation nor will either such outlet spring be able to contact upper or lower chamber face 68 or 69. The fluid in antechambers 80 and 82 is recombined in exit chamber 16 for discharge from flow meter housing 2 through outlet aperture 5.

Centering leaf springs 72 and 74 also serve to automatically vary the apparent clamping point of the downstream end of flexible sensor membrane 20 in accordance with the rate of fluid flow in the same manner, as described above with regard to long centering leaf springs 44 and 46 and short centering leaf springs 54 and 55. The apparent clamping point of the downstream end of flexible sensor membrane 20 is therefor adjusted in accordance with the fluid flow rate without moving the fixed clamping points, for example, at trailing edge 70. In particular, for low fluid flow rates, the furthest downstream point of undulating motion of flexible sensor membrane 20 will be adjacent flexure line 84 at the upstream edge of centering leaf spring 72. For higher rates of fluid flow, the furthest downstream undulating motion of flexible sensor membrane 20 will migrate toward downstream clamping point 73 at the upstream edge of upper and lower rigid mounting blocks 76 and 78.

The resistance to membrane flexure at the downstream end of the active membrane provided by outlet centering leaf springs 72 and 74 serves to further modify membrane behavior so that at high flow rates the membrane acts as if the clamping point was further downstream of downstream clamping point 73. That is, the apparent or effective downstream clamping point may be moved further downstream than the actual fixed clamping point, even extending the effective clamping span out of sensor chamber 14, by deforming the shape of the most downstream wave pattern in the membrane.

Figure 4:
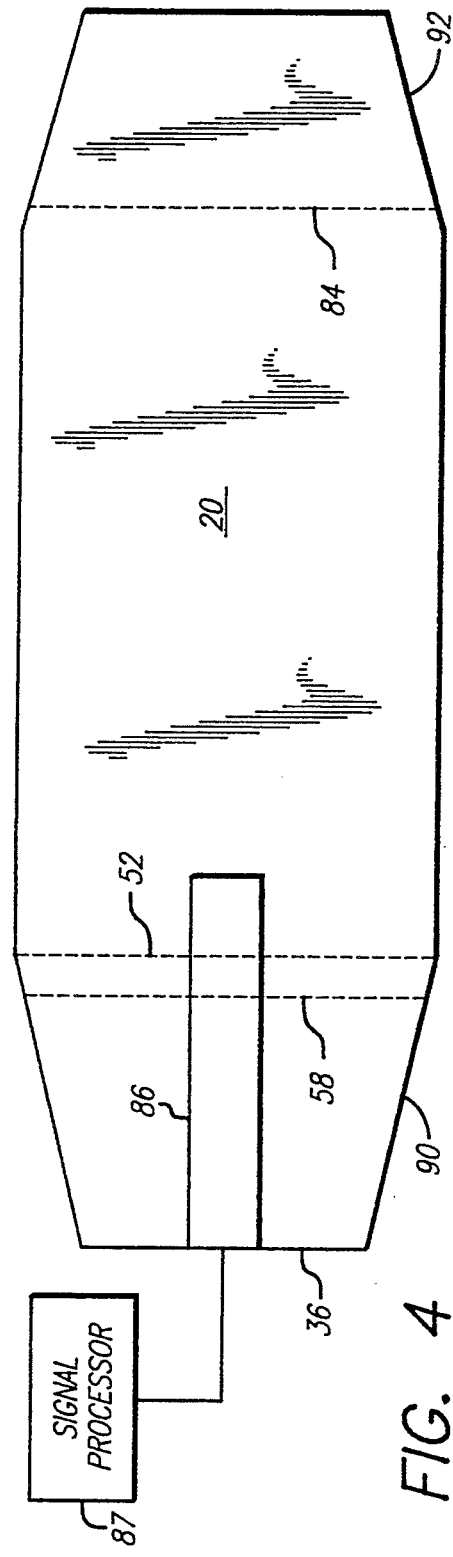
FIG. 4 is a top plan view of a preferred embodiment of a flexible membrane, together with a piezoelectric sensor and a signal processor, according to the present invention.

Referring now to FIG. 4, a top plan view of flexible sensor membrane 20 is shown, including piezoelectric sensor 86 mounted for example on the upper surface thereof extending downstream from leading edge 36 past second flexure line 58 to generate signals applied to signal processor 87 for the detection of flow and determination of flow rates in response to undulations of the membrane in accordance with known flexible flow meter signal processing techniques.

With reference now to FIGS. 1 and 2, the width of the active portion of flexible sensor membrane 20 in the portion of sensor chamber 14 extending from about first flexure line 52 downstream to about downstream flexure line 84, is substantially constant. The width of flexible sensor membrane 20 in this major portion of sensor chamber 14, and particularly within clamping span 88 between the apparent clamping points, should effectively be sufficient to prevent substantial fluid leakage between edges 27 and 29 thereof and sidewalls 24 and 26 without substantially restricting the undulating motion of the membrane.

As shown in FIG. 4, upstream and downstream membrane ends 90 and 92, respectively, of flexible sensor membrane 20 are substantially narrower than the portion of the membrane extending through the active portion of sensor chamber 14. It has been determined that such narrowing of the ends of the membrane reduces membrane flutter both along the flow path as well as transverse thereto. The width of the membrane is constant throughout the active portion of sensor chamber 14 within which contact between flexible sensor membrane 20 and upper and lower chamber faces 68 and 69, such as at membrane nodal points corresponding to wave crests 21, 23, and 25, may occur. The narrowing of upstream and downstream membrane ends 90 and 92 reduces flutter, and alters the resonant frequency of the membrane, to avoid resonance without altering the sensitivity of the membrane within sensor chamber 14.

Figure 8:
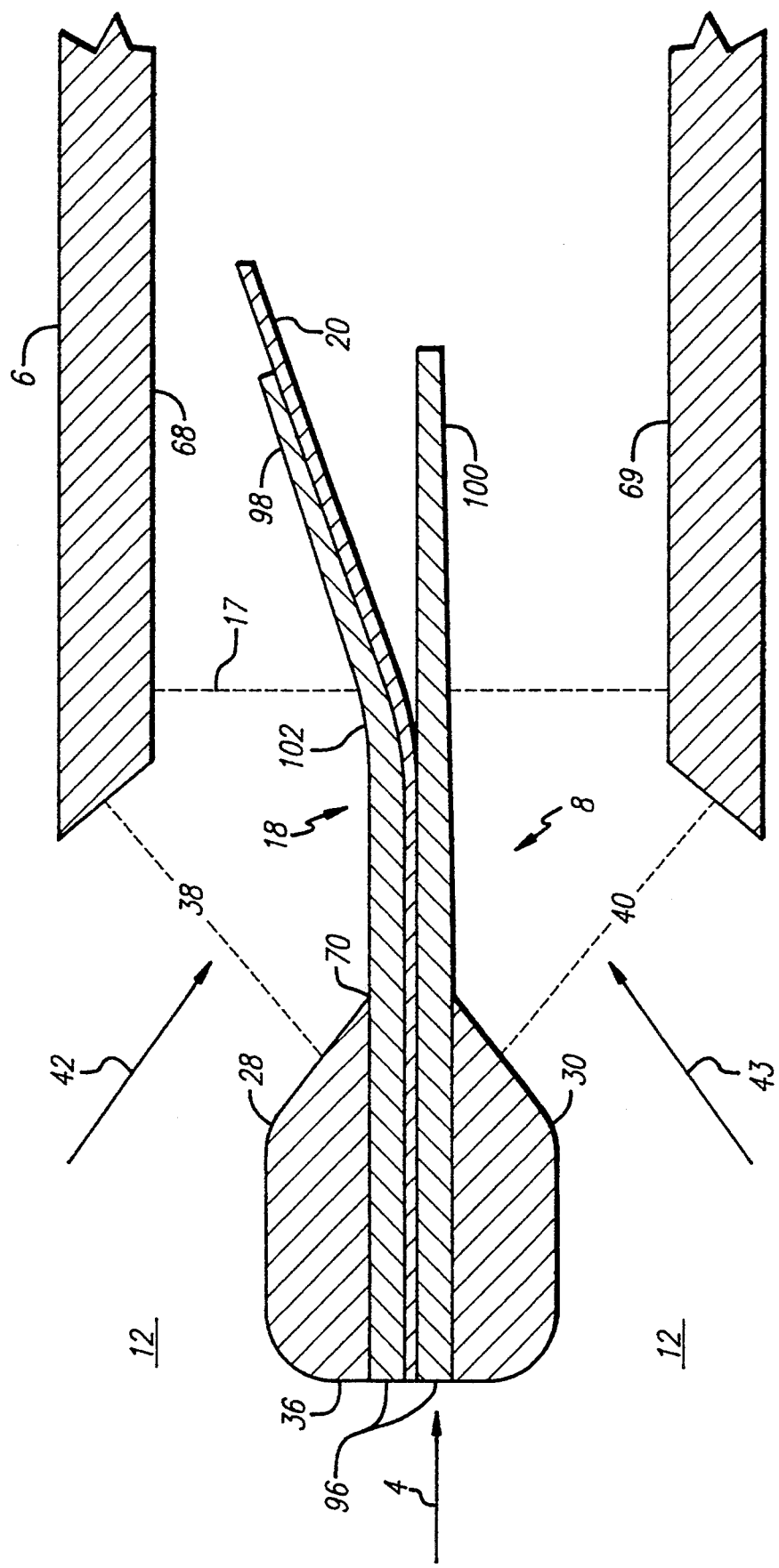
FIG. 8 is a cross section side view of an alternate embodiment of the fluid inlet portion of the flow meter shown in FIG. 3 which illustrates the bending of one spring at a time in a centering spring pair.

Referring now to FIG. 8, an alternate embodiment of inlet membrane mounting assembly 18 is shown in which long centering leaf spring 44 and 46 and short centering leaf springs 54 and 55 are replaced by variable resilience centering leaf spring pair 96 including upper tapered centering spring 98 and lower tapered centering spring 100. Each of the tapered centering springs is cantilever mounted in the fixed clamping point region from leading edge 36 through trailing edge 70 by upper and lower rigid mounting blocks 28 and 30. The thickness of the tapered centering springs is reduced as the springs extend into effective clamping span 88. In FIG. 8, inlet membrane mounting assembly 18 is shown during upward undulation of flexible sensor membrane 20 in which fluid flow through flow meter 10 has caused over pressure below the leading edge of the active membrane, and under pressure there above, so that the leading edge of flexible sensor membrane 20 has moved upward against the resistance of upper tapered centering spring 98 toward upper chamber face 68.

When the undulation of the membrane has reached its maximum, the upper surface of flexible sensor membrane 20 is in contact, or at higher flow rates at least approaches contact, with upper chamber face 68 and is about to toggle or snap and change directions to move back toward the central plane and from there toward contact with lower chamber face 69. At the toggle position, maximum energy is stored in upper tapered centering spring 98 and will be returned to flexible sensor membrane 20 as it moves downward. At this toggle position, the apparent clamping point, and therefore the upstream end of clamping span 88, is the point nearest the fixed clamping point region at trailing edge 70 at which flexible sensor membrane 20 has not moved from its centered position. The apparent upstream clamping point is generally indicated at point 102.

In operation of flow meter 10, the behavior of flexible sensor membrane 20 depends upon two discernable mechanisms, a quasi-static mechanism dominant at low flow rates and a dynamic mechanism dominant at higher flow rates. In the quasi-static mechanism, membrane behavior is primarily dependent upon the alternating pressure drops between upper and lower fluid streams 42 and 43, shown in FIGS. 3 and 8, and the elastic restoring forces of flexible sensor membrane 20 and the centering springs such as long leaf springs 44 and 46 and short leaf springs 54 and 55, shown in FIG. 3, or variable resilience centering leaf spring pair 96, shown in FIG. 8. In either embodiment, the elastic restoring forces of outlet centering leaf springs 72 and 74 also contribute to this mechanism.

As flexible sensor membrane 20 undulates at low fluid flow rates, a nodal or contact point is formed between the active membrane and one side of central flow chamber 6, such as upper chamber face 68. This contact point occurs downstream of the apparent upstream clamping point and the elastic restoring forces mentioned above tend to urge this nodal point downstream until the membrane toggles and snaps so that the membrane extending from the apparent clamping point moves through the center position toward contact with the opposite side of the chamber, such as lower chamber face 69. The process continues so that a pattern of waves is setup, the rate of travel of which is dependent upon the fluid flow rate.

At higher flow rates, membrane behavior approaches a pattern emulating infinite wave propagation. The elastic restoring forces accumulated in the bent centering springs provide almost exactly enough force to cause a smooth evolution of the next wave form crest so that at the instant of toggling or snapping from one side of the chamber to the other, the toggling of the membrane requires minimal energy from the fluid flow.

The dynamic mechanism, dominant at higher flow rates, includes the interaction of the fluid flow between flexible sensor membrane 20 and upper and lower chamber faces 68 and 69. As the membrane undulates due to fluid flow, the membrane approaches the chamber face. However, at such higher flow rates, fluid flows through the narrowed opening between undulating bulge of the membrane and the chamber face and further reduces the pressure between the membrane and the chamber face urging the membrane towards contact therewith. The effective relative excess membrane length in the clamping span does not permit such contact so the undulation of the membrane will continue, in a pattern resembling ocean waves, which provides flow rate measurements relatively independent of membrane material and thickness.

At higher flow rates, the flow energy affects both the amplitude and frequency of the wave like undulations of the flexible membrane. As the flow energy increases, it is desirable to channel the energy conversion into higher frequency undulations of the membrane, rather than higher amplitude undulations. The distance between the centerline of central flow chamber 6, and either chamber face 68 or 69, determines the maximum amplitude that the undulations may achieve without interference with the walls. If this amplitude is exceeded, the undesirable flattening of the wave crests referenced above, begins to occur and the energy is channelled into increased frequency rather than increased amplitude.

Referring now to FIGS. 1 through 7, dimensions of a particular physical embodiment of the present invention are provided in order to facilitate the disclosure of the best currently known mode of implementing the invention. In the particular physical embodiment to be described, the length and height of sensor chamber 14 were on the order of 90 mm and 6 mm, respectively. The excess membrane length was on the order of 2 mm while flexible sensor membrane 20 was on the order of 37 microns thick. It should be noted that increasing the thickness of the membrane provides reduced fluid leakage past edges 27 and 29 of the membrane but make the membrane less flexible and therefore less responsive to lower fluid flow rates. Long centering leaf spring pair 44 and 46 were each 22 mm long and 100 microns thick while outlet centering leaf springs 72 and 74 were about 5 mm long and 100 microns thick.

Referring in particular now to FIG. 6, upper and lower resilient guides 48 and 50 were about 200 microns thick, with the distance from trailing edge 70 to second flexure line 58 on the order of 15 mm and the distance from second flexure line 58 to distal edge 66 also on the order of about 15 mm. Outboard windows 60 and 64 were on the order of about 19 mm long and 11 mm high while central window 62 was 9 mm long and 11 mm high. Guide strips 61 and 63 were on the order of 3 mm wide so that upper and lower resilient guides 48 and 50 were on the order of about 59 mm wide.

It will be appreciated by persons skilled in the art that the present invention is not limited to what has been shown and described hereinabove, nor the dimensions or sizes of the physical implementation described immediately about. The scope of the invention is, rather, limited solely by the claims, which follow.

What is claimed is:

1. A fluid flow meter, comprising:
    a long, flexible membrane;
    upstream clamping means for mounting a first end of said membrane in an upstream clamping region in a fluid flow path;
    downstream clamping means for mounting a second end of said membrane in a downstream clamping region in said fluid flow path at a clamping span distance downstream from said upstream clamping region, the length of said membrane between said first and second ends exceeding said clamping span distance by an excess membrane length to permit an undulating motion of said flexible membrane along said clamping span distance in response to a rate of flow of fluid in said path;
    sensor means responsive to said undulating motion for measuring said flow of fluid in said path; and
    centering spring means within said clamping span distance adjacent a first one of said clamping regions for resiliently resisting motion of said membrane from a central plane substantially parallel to said path.

2. The invention of claim 1, wherein said centering spring means further comprises:
    apparent clamping point means for creating an apparent clamping point whose location changes from said first one of said clamping regions by a distance responsive to said rate of flow of fluid in said path.

3. The invention of claim 2, wherein said apparent clamping point means further comprises:
    means for creating an apparent clamping point downstream of said upstream clamping region.

4. The invention of claim 2, wherein said apparent clamping point means further comprises:
    means for creating an apparent clamping point upstream of said downstream clamping region.

5. The invention of claim 2, wherein said apparent clamping point means further comprises:
    means for creating an apparent clamping point downstream of said upstream clamping region; and
    means for creating another apparent clamping point upstream of said downstream clamping region.

6. The invention of claim 1, wherein said centering spring means further comprises:
    adaptive clamping span means for changing an effective relative excess membrane length in response to said rate of flow of fluid in said path by creating an apparent clamping span different from said clamping span distance.

7. The invention of claim 6, wherein said adaptive clamping span means further comprises:
    apparent clamping point means for creating an apparent clamping point whose location changes from said first one of said clamping regions by a distance responsive to said rate of flow of fluid in said path.

8. The invention of claim 1, wherein said centering spring means further comprises:
    second spring means within said clamping span distance for resiliently resisting motion of said membrane adjacent a second one of said clamping regions from said central plane.

9. The invention of claim 1, wherein said centering spring means further comprises:
    upstream leaf spring means for applying a restoring force to said membrane beginning from and extending downstream of an apparent clamping point displaced downstream of said upstream clamping region to resist said motion of said membrane from said central plane.

10. The invention of claim 9, wherein said leaf spring means further comprises:
    adaptive restoring means for altering said displacement of said apparent clamping point from said upstream clamping region as a function of said rate of flow of said fluid in said path.

11. The invention of claim 10, wherein said restoring force is non-linearly related to said displacement of said apparent clamping point from said upstream clamping region.

12. The invention of 1, wherein said centering spring means further comprises:
    downstream leaf spring means for applying a restoring force to said membrane beginning from and extending upstream of an apparent clamping point displaced upstream of said downstream clamping region to resist said motion of said membrane from said central plane.

13. The invention of claim 12, wherein said downstream leaf spring means further comprises:
    downstream adaptive restoring means for altering said displacement of said apparent clamping point from said downstream clamping region as a function of said rate of flow of said fluid in said path.

14. The invention of claim 13, wherein said restoring force is non-linearly related to said displacement of said apparent clamping point from said downstream clamping region.

15. The invention of claim 1, wherein said centering spring means further comprises:
upstream leaf spring means for applying a restoring force to said membrane beginning from and extending downstream of an apparent clamping point displaced downstream of said upstream clamping region to resist said motion of said membrane from said central plane; and
downstream leaf spring means for applying a restoring force to said membrane beginning from and extending upstream of an apparent clamping point displaced upstream of said downstream clamping region to resist said motion of said membrane from said central plane.

16. The invention of claim 15 wherein said leaf spring means further comprise:
adaptive restoring means for altering said displacements of said apparent clamping points as a function of said rate of flow of said fluid in said path.

17. The invention of claim 15 wherein said restoring forces are non-linearly related to said displacement of said apparent clamping points.

18. The invention of claim 1 wherein said centering spring means further comprises:
leaf spring means for adaptively restoring elastic energy to said membrane in response to motion of said membrane from said central plane.

19. The invention of claim 18, wherein said leaf spring means further comprises:
upstream leaf spring means for restoring elastic energy to said membrane in response to motion of said membrane adjacent said upstream clamping region.

20. The invention of 18, wherein said leaf spring means further comprises:
downstream leaf spring means for restoring elastic energy to said membrane in response to motion of said membrane adjacent said downstream clamping region.

21. The invention of claim 18, wherein said leaf spring means further comprises:
upstream leaf spring means for restoring elastic energy to said membrane in response to motion of said membrane adjacent said upstream clamping region; and
downstream leaf spring means for restoring elastic energy to said membrane in response to motion of said membrane adjacent said downstream clamping region.

22. The invention of claim 1, wherein said centering spring means further comprises:
leaf spring means for modifying the behavior of said membrane to simulate the behavior of a membrane having a different length.

23. The invention of claim 22, wherein said leaf spring means further comprises:
upstream leaf spring means for modifying the behavior of said membrane to simulate the behavior of a membrane extending upstream of said upstream clamping region.

24. The invention of claim 22, wherein said leaf spring means further comprises:
downstream leaf spring means for modifying the behavior of said membrane to simulate the behavior of a membrane extending downstream of said downstream clamping region.

25. The invention of claim 22, wherein said leaf spring means further comprises:
downstream leaf spring means for modifying the behavior of said membrane to simulate the behavior of a membrane extending downstream of said downstream clamping region; and
upstream leaf spring means for modifying the behavior of said membrane to simulate the behavior of a membrane extending upstream of said upstream clamping region.

26. The invention of claim 1 wherein said centering spring means further comprises:
leaf spring means for modifying the resonant frequency of said membrane.

27. The invention of claim 1, wherein said centering spring means further comprises:
a pair of equal length inner leaf springs cantilever supported on either side of said membrane by said upstream clamping region and extending downstream therefrom a first flexure point distance along said central plane.

28. The invention of claim 27, wherein said centering spring means further comprises:
a pair of equal length outer leaf springs cantilever supported on either side of said inner leaf springs by said upstream clamping region and extending downstream therefrom along said central plane to a second flexure point at a distance shorter than said first flexure point distance.

29. The invention of claim 28, wherein said outer leaf springs each further comprise:
a permeable, flexible guide extending outward from said second flexure point away from said central plane.

30. The invention of claim 29 wherein each said flexible guide further comprises:
a pair of outboard windows for directing substantially equal streams of fluid downstream to enhance membrane behavior.

31. The invention of claim 1, wherein said membrane further comprises:
a clamping span width within said clamping span distance; and
a first end width narrower than said clamping span width at a first one of said membrane ends.

32. The invention of claim 31, wherein said membrane further comprises:
a second end width narrower than said clamping span width at a second one of said membrane ends.

33. The invention of claim 1, wherein said upstream clamping means further comprises:
leading edge means for dividing said flow of said fluid in said path into a pair of streams of equal, rectangular cross sectional area to reduce turbulence downstream of said upstream clamping means.

34. The invention of claim 1, wherein said downstream clamping means further comprises:
flow redirecting means for substantially altering said path downstream of said clamping span distance to enhance membrane behavior at said second end.

35. The invention of claim 2, wherein said apparent clamping point means further comprises:
means for creating an apparent clamping point downstream of said downstream clamping region.

36. The invention of claim 2, wherein said apparent clamping point means further comprises:
  means for creating an apparent clamping point downstream of said upstream clamping region; and
  means for creating another apparent clamping point downstream of said downstream clamping region.

37. A fluid flow meter, comprising:
  a flexible membrane having a first length;
  a fluid flow chamber including a fluid flow inlet port and a fluid flow exit port and a fluid flow path defined therebetween;
  a first pair of flexible leaf springs;
  inlet clamping means for clamping said pair of leaf springs to lie flat along either side of a first end of said membrane adjacent said fluid flow inlet port in a central plane in said fluid flow chamber; and
  exit clamping means for clamping a second end of said membrane in said central plane adjacent said fluid flow exit port at a distance from said first end less than said first length, whereby undulation of said membrane at said first end is resisted by said pair of leaf springs.

38. The invention of claim 37, wherein said first pair of leaf springs further comprises:
  a second pair of equal length leaf springs.

39. The invention of claim 37, further comprising:
  a second pair of equal length leaf springs, shorter than said first pair, said second pair of leaf springs being clamped by said inlet clamping means to lie flat along either side of said first pair of leaf springs in said fluid flow chamber.

40. The invention of claim 38, further comprising:
  a third pair of equal length leaf springs, said third pair of leaf springs being clamped by said exit clamping means to lie flat along said second end of said membrane in said central plane in said fluid flow chamber, whereby said undulation of said membrane at said second end is resisted by said third pair of leaf springs.

41. The invention of claim 38, wherein each of said leaf springs in said second pair of leaf springs further comprises:
  a permeable, flexible guide extending outward a downstream end thereof toward an inner surface of said fluid flow chamber.

42. The invention of claim 41 wherein each said flexible guide further comprises:
  a pair of outboard windows for directing substantially equal streams of fluid in said fluid flow chamber to enhance membrane behavior.

43. The invention of claim 37, wherein said membrane further comprises:
  a first width within said fluid flow chamber; and
  a second width narrower than said first width at a first one of said first and second ends of said membrane.

44. The invention of claim 43, wherein said membrane further comprises:
  a third width narrower than said first width at a second one of said membrane ends.

45. The invention of claim 37, wherein said inlet clamping means further comprises:
  leading edge means for dividing said flow of said fluid in said fluid flow path into a pair of streams of equal, rectangular cross sectional area to reduce turbulence downstream of said inlet clamping means.

46. The invention of claim 37, wherein said exit clamping means further comprises:
  flow redirecting means for substantially altering said fluid flow path downstream of said exit clamping means.

47. A method for enhancing the behavior of a flexible membrane in a fluid flow meter, comprising the steps of:
  mounting a flexible membrane in a fluid flow chamber;
  clamping a first pair of leaf springs to lie against said membrane along either side of a first end of said membrane in a central plane in said fluid flow chamber; and
  clamping a second end of said membrane in said central plane, whereby undulation of said membrane at said first end is resisted by said pair of leaf springs.

48. The invention of claim 47, wherein the step of clamping said first pair of leaf springs further comprises the step of:
  clamping a second pair of leaf springs, shorter than said first pair, to lie along either side of said first pair of leaf springs in said fluid flow chamber.

49. The invention of claim 48, wherein the step of clamping said second end of said membrane further comprises the step of:
  clamping a third pair of leaf springs to lie along said central plane at said second end of said membrane.

50. The invention of claim 48, wherein the step of clamping said second end of said membrane further comprises the step of:
  mounting a permeable guide extending outward from each of said second pair of leaf springs toward an inner surface of said fluid flow chamber.

51. The invention of claim 48, further comprising the step of:
  directing a pair of equal streams of fluid in said fluid flow chamber on each side of said membrane.

52. The invention of claim 47, further comprising the step of:
  reducing the width of said membrane within said fluid flow chamber adjacent one end of said membrane.

53. The invention of claim 52, wherein said step of reducing the width of the membrane further comprises the step of:
  reducing the width of said membrane at the other end of said membrane.

54. The invention of claim 47, wherein said step of mounting said first pair of leaf springs further comprises:
  dividing said flow of said fluid in said chamber into a pair of streams of equal, rectangular cross-section, one of said streams flowing above and one of said streams flowing below said membrane.

55. The invention of claim 47, wherein said step of clamping said second end of said membrane further comprises the step of:
  substantially altering said fluid flow path downstream of said second end.

* * * * *